NELSON PALMER.
Improvement in Hay Elevators.
No. 1,423 Reissued March, 3 1863.
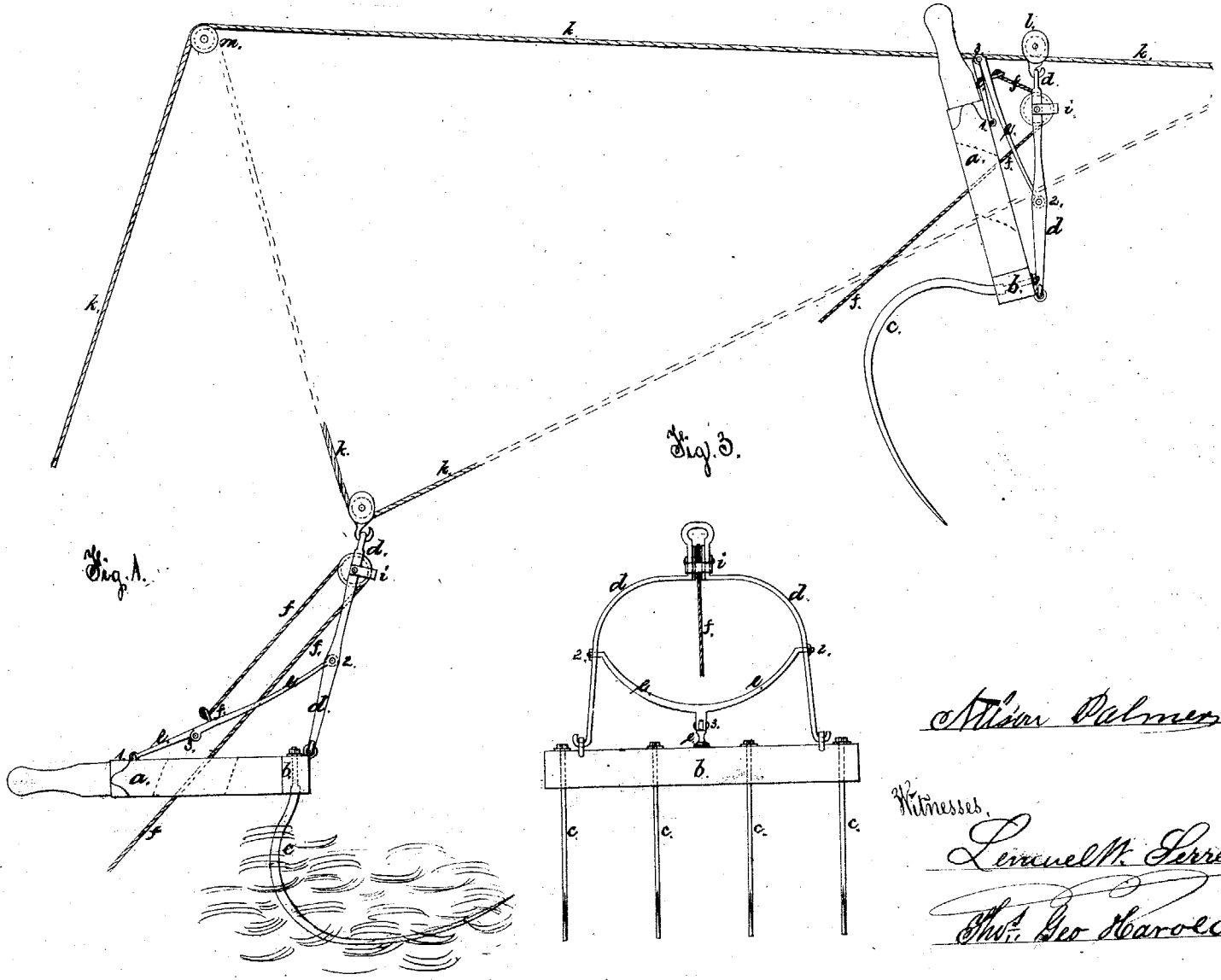
Witnesses,
Lemuel M. Serrell
Thos. Geo Harold
Nelson Palmer

UNITED STATES PATENT OFFICE.

NELSON PALMER, OF GREENVILLE, NEW YORK.

IMPROVEMENT IN HAY-ELEVATING FORKS.

Specification forming part of Letters Patent No. 36,572, dated September 30, 1862; Reissue No. 1,423, dated March 3, 1863.

*To all whom it may concern:*

Be it known that I, NELSON PALMER, of Greenville, in the county of Greene and State of New York, have invented, made, and applied to use a certain Improvement in Hay-Elevators; and I do hereby declare the following to be a full, clear, and exact description of the same, reference being had to the annexed drawings, making part of this specification, wherein—

Figure 1 is an elevation of my fork as in use. Fig. 2 represents the fork after the hay has been discharged; and Fig. 3 is an elevation of the bail, head, and tines.

Similar marks of reference denote the same parts.

The nature of my said invention consists in a hay-fork fitted with tines extending below the head of the fork, and curved forward in such a manner that the hay will hang partially below the head of the fork, in order that the said fork may not tip sidewise while conveying the load, and so that the handle will be sufficiently above the mow to swing on the head of the fork in the act of drawing the tines out from beneath the hay. The fork itself swings at the head thereof on eyes or hinges of a bail or sustaining-bar passing to the elevating-rope, and a brace or blocking bar acted upon by a rope or its equivalent holds the fork so that the hay cannot be delivered except when said brace or blocking bar is moved to allow the said fork to swing on the head thereof.

In the drawings, *a* is a handle, with the head-piece *b* receiving the tines *c*. These tines pass down from the lower side of the head-piece, and are curved upon the arc of an ellipse from the points of motion above on which the fork swings, so that they draw away from beneath the hay without disturbing the same, as hereinafter specified.

*d* is a bail attached by hinges or eyes to the head-piece *b*.

*e* is a brace, formed as a toggle-joint, one end being attached, as at 1, to the handle *a*, and the other end at 2 to the bail *d*. These brace-bars are united by a rule-joint, 3, that passes slightly below the line of centers, so that any end-thrust cannot shut the brace together; but when the center joint, 3, is drawn up away from the handle *a* the brace and handle fold up against the bail *d*, as seen in Fig. 2, the parts being of the proper relative lengths, as shown.

*f* is a rope attached to or near the joint 3, passing through a block, *i*, above the bail *d*, thence back through a mortise in the handle near the head *b*.

The hay-elevator is sustained by a rope, *k*, passing through a block, *l*.

The operation is as follows: The loading-rope *k* is passed from a horse through a block on the barn-floor, thence through a block, *m*, near the barn-rafters, and thence through the block *l*, the end being fastened in the direction the hay is to be conveyed, as now usual. The fork or elevator is stuck into the hay; no matter in what portion of the load or in what direction, the brace and parts are to be in the position shown in Fig. 1. When the horse pulls on the main rope *k* the loaded elevator is raised bodily, and then runs off to the required point of delivery, as usual, along the inclined rope. When the attendant pulls the check-rope *f* the joint 3 is raised and the hay delivered off the tines (curved as aforesaid) by said tines drawing from beneath it as the elevator swings on the eyes of the bail *d*, and at the upper part thereof at the block *l*. The parts assume the position of Fig. 2, ready to be drawn back to the load and again employed, as before.

If the elevator is used for loading a cart from the mow, the inclination of the rope *k* is reversed, as usual.

What I claim, and desire to secure by Letters Patent, is—

1. The hay-elevator formed by the handle *a*, head *b*, and tines *c*, when said tines pass below the head and extend forward for receiving the hay, substantially as specified, whereby said fork will not tip sidewise when raised by power applied to the head of the fork, and the handle is sufficiently above the bottom of the hay on the tines to allow said handle to swing clear of the hay on the mow or on the cart, as set forth.

2. The brace or toggle-joint bar *e*, in combination with the bail or sustaining-bar and the handle of the fork, as specified, whereby the fork is rendered rigid in lifting the hay, but allowed to swing and deliver the hay when said brace or bar is acted upon, as set forth.

3. The discharging-rope *f* and sheave *i*, arranged as shown, in combination with the toggle-joint brace *e*, fork *a b c*, and bail or sustaining-bar *d*, for the purposes specified.

In witness whereof I have hereunto set my signature this 19th day of November, 1862.

NELSON PALMER.

Witnesses:

LEMUEL W. SERRELL,
THOS. GEO. HAROLD.